(12) United States Patent
Son et al.

(10) Patent No.: US 11,685,232 B2
(45) Date of Patent: Jun. 27, 2023

(54) ELECTRONIC CONTROL VALVE FOR HVAC SYSTEM OF VEHICLE AND CONTROL METHOD OF HVAC SYSTEM

(71) Applicants: Hyundai Motor Company, Seoul (KR); Kia Motors Corporation, Seoul (KR)

(72) Inventors: Ji-Wan Son, Whasung-Si (KR); Tae-Hun Jung, Whasung-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 564 days.

(21) Appl. No.: 16/702,991

(22) Filed: Dec. 4, 2019

(65) Prior Publication Data

US 2020/0369119 A1 Nov. 26, 2020

(30) Foreign Application Priority Data

May 20, 2019 (KR) .......................... 10-2019-0058747

(51) Int. Cl.
*B60H 1/00* (2006.01)
*B60H 1/32* (2006.01)
(Continued)

(52) U.S. Cl.
CPC ..... *B60H 1/00885* (2013.01); *B60H 1/00735* (2013.01); *B60H 1/3223* (2013.01);
(Continued)

(58) Field of Classification Search
CPC ......... F04B 27/0865; F04B 2027/1822; B60H 1/00885; B60H 1/00735; B60H 1/3223;
(Continued)

(56) References Cited

U.S. PATENT DOCUMENTS 5,000,667 A * 3/1991 Taguchi ................ F04B 27/086
 417/270
5,065,589 A * 11/1991 Taguchi .................. F04B 49/20
 62/229

(Continued)

FOREIGN PATENT DOCUMENTS

| KR | 10-1272950 B1 | 6/2013 | |
| WO | WO-2017002784 A1 * | 1/2017 | .......... F04B 27/0839 |
| WO | WO-2019146965 A1 * | 8/2019 | .............. F04B 27/10 |

*Primary Examiner* — Nelson J Nieves
(74) *Attorney, Agent, or Firm* — Morgan, Lewis & Bockius LLP

(57) ABSTRACT

An electronic control valve for an HVAC system of a vehicle may include, in the electronic control valve configured to control the angle of a swash plate (angle with respect to the surface perpendicular to a rotation shaft of a compressor) in the compressor in an HVAC system, a solenoid, a plunger coupled to the solenoid member and configured to slid according to whether the solenoid is magnetized, a valve body formed integrally with the plunger, and configured to open or close a supply flow path through which a fluid flows into the compressor, a discharge flow path through which a fluid is discharged from the compressor, and a control flow path through a fluid flows to control the angle of the swash plate mounted inside the compressor, a diaphragm configured to operate the plunger by the pressure of refrigerant, and a return spring configured to return the plunger, and the solenoid is applied with power according to a vehicle target cooling load.

8 Claims, 8 Drawing Sheets

(51) Int. Cl.
*F04B 27/08* (2006.01)
*F04B 37/10* (2006.01)
*F04B 27/22* (2006.01)

(52) U.S. Cl.
CPC .......... *F04B 27/0865* (2013.01); *F04B 27/22* (2013.01); *F04B 37/10* (2013.01); *B60H 2001/3238* (2013.01); *B60H 2001/3255* (2013.01); *B60H 2001/3266* (2013.01)

(58) Field of Classification Search
CPC .... B60H 2001/3238; B60H 2001/3255; B60H 2001/3266
See application file for complete search history.

(56) References Cited

U.S. PATENT DOCUMENTS

| | | | | |
|---|---|---|---|---|
| 5,584,670 | A * | 12/1996 | Kawaguchi | F04B 49/225 417/295 |
| 5,636,973 | A * | 6/1997 | Sonobe | F04B 49/22 417/298 |
| 5,653,119 | A * | 8/1997 | Kimura | F25B 41/20 62/505 |
| 5,681,150 | A * | 10/1997 | Kawaguchi | F04B 27/1804 417/295 |
| 5,890,876 | A * | 4/1999 | Suito | F04B 27/1804 417/213 |
| 5,897,298 | A * | 4/1999 | Umemura | F04B 27/1804 417/269 |
| 6,244,159 | B1 * | 6/2001 | Kimura | F04B 27/1036 92/12.2 |
| 6,302,656 | B1 * | 10/2001 | Hirota | F04B 27/1804 417/222.2 |
| 6,386,834 | B1 * | 5/2002 | Kimura | F04B 27/1804 417/222.2 |
| 6,434,956 | B1 * | 8/2002 | Ota | F04B 27/1804 62/133 |
| 6,481,227 | B1 * | 11/2002 | Ota | F25B 41/335 62/228.3 |
| 6,729,853 | B2 * | 5/2004 | Umemura | F04B 27/1804 417/222.1 |
| 7,611,335 | B2 * | 11/2009 | Warren | F04B 27/1804 417/222.2 |
| 2004/0025524 | A1 * | 2/2004 | Saeki | F04B 27/1804 62/228.4 |
| 2004/0258536 | A1 * | 12/2004 | Ota | F04B 27/1804 417/269 |
| 2005/0123409 | A1 * | 6/2005 | Ota | F25B 49/022 417/222.1 |
| 2008/0247883 | A1 * | 10/2008 | Yokomachi | F04B 27/1804 417/218 |
| 2011/0182753 | A1 * | 7/2011 | Taguchi | F04B 27/1804 92/12.1 |
| 2013/0001450 | A1 * | 1/2013 | Hirota | F04B 49/22 251/129.15 |
| 2013/0272859 | A1 * | 10/2013 | Taguchi | F04B 39/10 415/182.1 |
| 2015/0275874 | A1 * | 10/2015 | Ota | F04B 27/1804 417/222.1 |
| 2015/0345655 | A1 * | 12/2015 | Higashidozono | F04B 27/1804 137/624.27 |
| 2017/0363074 | A1 * | 12/2017 | Taguchi | F04B 39/08 |
| 2018/0128252 | A1 * | 5/2018 | Yamamoto | F04B 27/1804 |
| 2021/0033080 | A1 * | 2/2021 | Kwak | F04B 49/065 |

* cited by examiner

ELECTRONIC CONTROL VALVE FOR HVAC SYSTEM OF VEHICLE AND CONTROL METHOD OF HVAC SYSTEM

CROSS-REFERENCE TO RELATED APPLICATION

The present application claims priority to Korean Patent Application No. 10-2019-0058747, filed on May 20, 2019, the entire contents of which is incorporated herein for all purposes by this reference.

BACKGROUND OF THE PRESENT INVENTION

Field of the Invention

The present invention relates to an electronic control valve for the HVAC system of a vehicle, and a control method of the HVAC system, which may have a simple hardware structure and may be controlled with a minimum load according to the condition of a vehicle.

Description of Related Art

A vehicle is applied with a Heating, Ventilation, & Air Conditioning system (HVAC system) for conditioning the air supplied to a vehicle interior.

The HVAC system passes air supplied to the vehicle interior through a heater core or an evaporator, and then supplies it to the vehicle interior to heat, cool, or dehumidify the vehicle interior.

FIG. 1 is a diagram showing a heating, ventilation, and air conditioning (HVAC) system according to the related art.

An HVAC system 110 is controlled by an HVAC controller 120 configured to control it to condition the air supplied to the vehicle interior.

The HVAC controller 120 receives a measured value measured from various sensors mounted in the vehicle, for example, an internal temperature sensor 131 configured to measure a temperature inside the vehicle interior, an external temperature sensor 132 configured to measure a temperature outside the vehicle, a solar sensor 133 configured to measure the sunshine state of sun, a humidity sensor 134 configured to measure humidity inside the vehicle interior, an evaporator temperature sensor 135 configured to measure the temperature of the air having passed through the evaporator, and the like.

Furthermore, the HVAC controller 120 receives information on the operating state of the vehicle from an engine management system (EMS) 165 configured to control an engine 161 of the vehicle through CAN communication, or the like. The EMS 165 controls the engine 161 so that an output corresponding to a driver's request input from an accelerator pedal 163 is exerted, and the information configured to control the engine 161 is also delivered to the HVAC controller 120.

The HVAC controller 120 controls the HVAC system 110 to condition the air in the vehicle interior in a state desired by a passenger through information input from the sensors, information provided from the EMS 165, and the like.

When cooling the vehicle interior, the HVAC system 110 determines a cooling load required according to the operating state of the HVAC system 110, the temperature input by the passenger, the current load of the HVAC system 110, and the driving state of the vehicle, and variably operates a compressor 140 in the HVAC system 110 so that the HVAC system 110 exerts the required cooling load.

The compressor 140 is variably operated by variably operating the position of a piston 141 by adjusting the angle of a swash plate 142. As described above, to variably control the compressor 140, an Electronic Control Valve (ECV) 150 configured to control the angle of the swash plate 142 is mounted at one side of the compressor 140. The electronic control valve 150 is controlled by a valve controller 121 separately provided in the HVAC controller 120. For example, the valve controller 121 changes the angle of the swash plate 142 by controlling the duty of power applied to a solenoid provided in the electronic control valve 150.

When the duty of power applied to the solenoid of the electronic control valve 150 is controlled, the angle of the swash plate 142 may be continuously controlled, controlling the compressor 140 to a desired capacity from a minimum capacity to a maximum capacity.

However, to control the duty of power supplied to the electronic control valve 150, there is a problem in that a structure of the electronic control valve 150 may be formed in a complicated structure.

As described above, when the structure of the electronic control valve 150 is complicated, the production cost of the vehicle increases, which is a factor of lowering the price competitiveness.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a heating, ventilation, and air conditioning (HVAC) system for a vehicle, an electronic control valve for the HVAC system, and a control method of the HVAC system, which is formed of a simple structure, and allows a compressor to operate at any one of a minimum capacity and a maximum capacity.

An electronic control valve for an HVAC system according to an exemplary embodiment of the present invention for achieving the object includes, in the electronic control valve configured to control the angle of a swash plate (angle with respect to the surface perpendicular to a rotation shaft of a compressor) in the compressor in an HVAC system, a solenoid, a plunger coupled to the solenoid member and configured to slid according to whether the solenoid is magnetized, a valve body formed integrally with the plunger, and configured to open or close a supply flow path through which a fluid flows into the compressor, a discharge flow path through which a fluid is discharged from the compressor, and a control flow path through a fluid flows to control the angle of the swash plate mounted inside the compressor, a diaphragm configured to operate the plunger by the pressure of refrigerant, and a return spring configured to return the plunger, and the solenoid is applied with power according to a vehicle target cooling load.

The angle of the swash plate is controlled by the HVAC controller so that the angle of the swash plate is any one of the maximum and the minimum.

When the vehicle target cooling load is equal to a maximum load, the power supplied to the solenoid is blocked and a tilt angle of the swash plate maintains a maximum state thereof so that the swash plate compresses the refrigerant to a maximum.

When the vehicle target cooling load is equal to a minimum load, the power is supplied to the solenoid and the tilt angle of the swash plate is changed to a minimum state so that the swash plate compresses the refrigerant to a minimum.

The electronic control valve includes a supply flow path through which a fluid flows into the compressor, a discharge flow path through which a fluid is discharged from the compressor, and a control flow path controlling the angle of the swash plate mounted inside the compressor, and the electronic control valve maintains a closed state thereof or is open according to a power application of the solenoid and a pressure of the refrigerant supplied to the supply flow path.

When the power is not applied to the solenoid, and the pressure of the supply flow path is equal to or more than a first setting pressure set to change the opening and closing the control flow path in a state where power has been not applied, the electronic control valve is maintained in a closed state thereof.

When the power is not applied to the solenoid, and the pressure of the supply flow path is equal to or less than a first setting pressure set to change the opening and closing the control flow path in a state where power has been not applied, the electronic control valve is changed to an open state.

When the power is applied to the solenoid, and the pressure of the supply flow path is equal to or more than a second setting pressure set to change the opening and closing the control flow path in a state where power has been applied, the electronic control valve is maintained in a closed state thereof.

When the power is applied to the solenoid, and the pressure of the supply flow path is equal to or less than a second setting pressure set to change the opening and closing the control flow path in a state where power has been applied, the electronic control valve is changed to an open state.

Furthermore, a control method of an HVAC system according to an exemplary embodiment of the present invention includes, in the control method of the HVAC system controlling, by an HVAC controller, the HVAC system configured to harmonize air supplied to a vehicle interior, inputting cooling state in which an internal temperature of the vehicle, a target temperature set by a passenger, and an operating state of a compressor in the HVAC system are input to the HVAC controller, inputting a vehicle state in which the operating state of the vehicle is input to the HVAC controller, determining a cooling load that determines, by the HVAC controller, a vehicle target cooling load having reflected the cooling state of the vehicle and the operating state of the vehicle, selecting the cooling load that determines, by the HVAC controller, whether the compressor may be operated at any one selected from the maximum load and the minimum load to be cooled at the determined vehicle target cooling load, and driving the compressor that operates, by the HVAC controller, the compressor according to the cooling load selected in the selecting the cooling load.

The driving the compressor includes driving the maximum load that drives, by the compressor, refrigerant at the maximum load set to compress to the maximum, and driving the minimum load that drives, by the compressor, the refrigerant at the minimum load set to compress to the minimum, and any one selected in the selecting the cooling load of the driving the maximum load and the driving the minimum load is selectively performed.

The maximum load is set to the maximum value of the load allowed for the compressor, and the minimum load is set to 4% to 6% of the maximum load.

The determining the cooling load determines the vehicle target cooling load to the maximum load, when any one of a first target cooling load required according to a current cooling state of the vehicle, and a second target cooling load required according to an operating state of the vehicle is the maximum load.

The HVAC controller sets the first target cooling load to the maximum load, when a difference between the internal temperature of the vehicle and the target temperature is greater than a maximum load determination temperature difference set to operate the compressor at the maximum load, and when the difference between the internal temperature of the vehicle and the target temperature is not greater than the maximum load determination temperature difference, the first target cooling load is set to the minimum load.

The HVAC controller sets the second target cooling load to the minimum load, when it is determined that the operating state of the vehicle is an insufficient engine power, and sets the second target cooling load to the maximum load, when it is determined that the operating state of the vehicle is not an insufficient engine power.

The HVAC controller sets the second target cooling load to the minimum load by determining that the operating state of the vehicle is an insufficient engine power, when it is operated in a state where the operating state of the vehicle input from an Engine Management System (EMS) configured to control an engine is any one among starting, overtaking, uphill, acceleration, or braking.

The determining the cooling load determines the vehicle target cooling load as the minimum load, when both of a first target cooling load required according to a current cooling state of the vehicle, and a second target cooling load required according to an operating state of the vehicle are the minimum load.

The control method of the HVAC system further includes determining an air conditioner operation request that determines whether there is a request for the cooling from a passenger before the inputting the cooling state, and when it is determined that there is a request for the cooling from the passenger, the inputting the cooling state is performed.

In the inputting the cooling state and the inputting the vehicle state, the inputting the vehicle state is first performed and then the inputting the cooling state is performed.

The control method of the HVAC system further includes, after the driving the compressor has been performed, determining an air conditioner termination request that determines whether there is a request for termination of operating the compressor from the HVAC controller, and when there is no request for termination of operating the compressor in the determining the air conditioner termination request, it returns to the inputting the cooling state.

According to the electronic control valve for the HVAC system of the vehicle, and the control method of the HVAC system of the present invention having the above configuration, it is possible to actively operate the compressor at the minimum load considering the cooling state of the vehicle interior and the driving state of the vehicle.

Furthermore, it is possible to maintain the essential function of variably controlling the compressor even while simplifying the structure of the electronic control valve, lowering the production cost of the vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
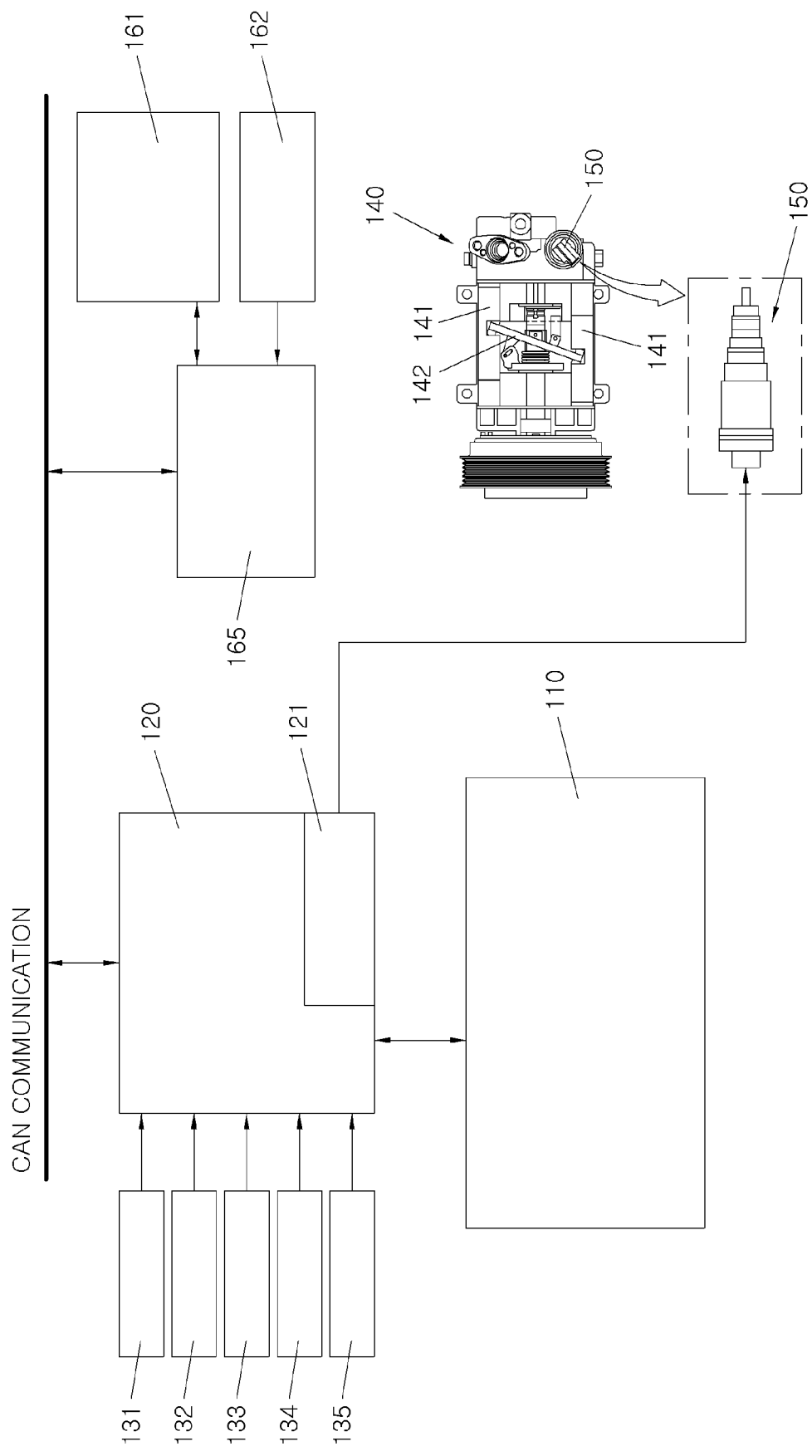
FIG. 1 is a block diagram showing a heating, ventilation, and air conditioning (HVAC) system for a vehicle according to the related art.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, an electronic control valve for the HVAC system of a vehicle, and a control method of the HVAC system according to an exemplary embodiment of the present invention will be described in detail with reference to the accompanying drawings.

Figure 2:
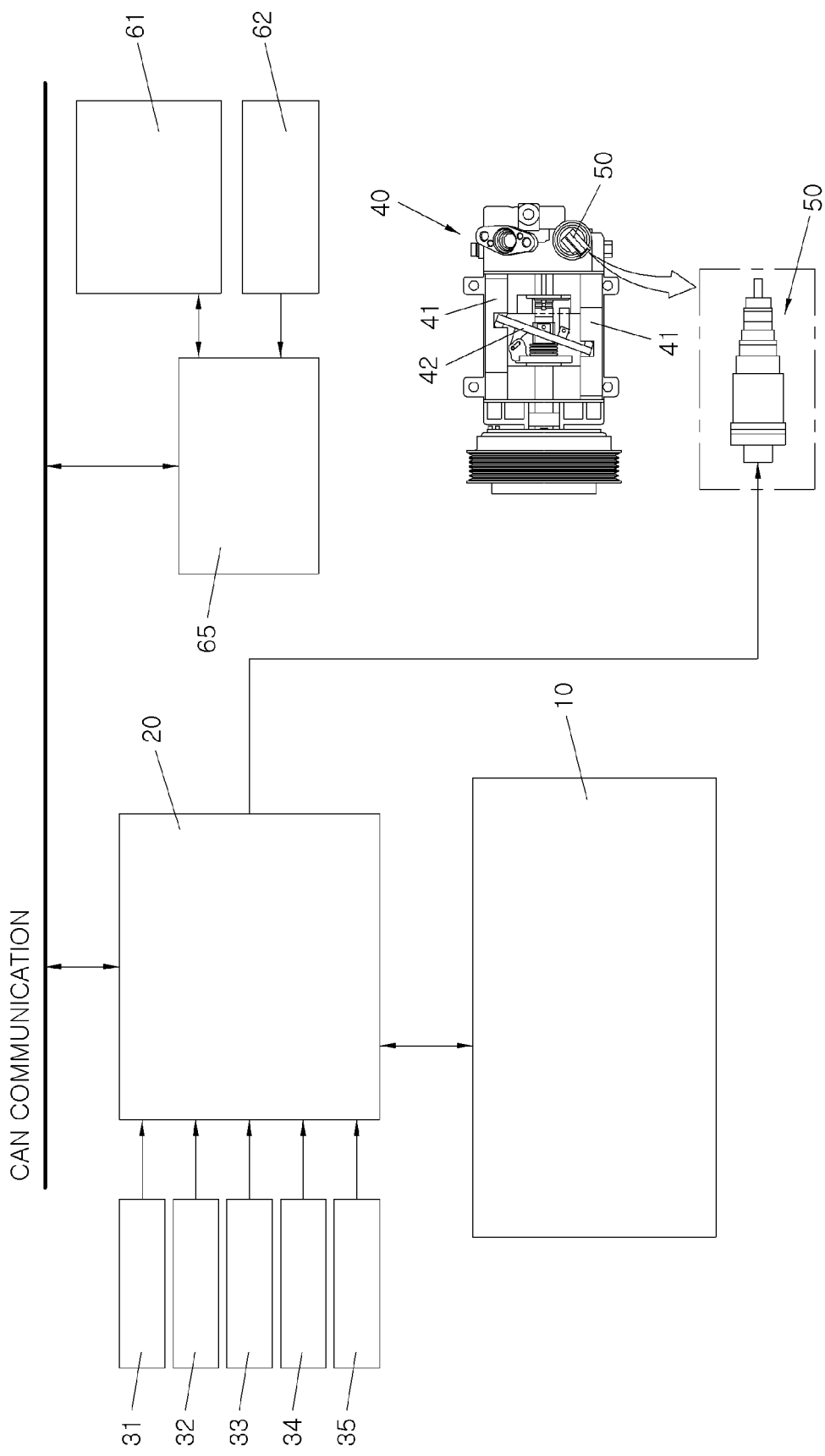
FIG. 2 is a block diagram showing an HVAC system for a vehicle according to an exemplary embodiment of the present invention.

A heating, ventilation, and air conditioning (HVAC) system for a vehicle according to an exemplary embodiment of the present invention has a configuration as shown in FIG. 2.

The HVAC system according to an exemplary embodiment of the present invention includes an HVAC controller 20 configured to control an HVAC system 10 for a vehicle, in the HVAC system 10 for the vehicle configured to supply it to the internal in a harmonized state by heating, cooling and dehumidifying the air supplied to the interior of the vehicle, and the HVAC controller 20 controls the compressor 40 by selecting any one of a maximum load (L_max) and a minimum load (L_min) according to a vehicle target cooling load (L) determined by the HVAC controller 20.

The HVAC system 10 is provided for harmonizing and supplying the air supplied from the outside of the vehicle to the internal as the air in a state desired by a passenger through a heater core or an evaporator.

The HVAC system 10 is controlled by the HVAC controller 20 configured to control the HVAC system 10 to control the temperature of the heater core or the evaporator, and to adjust the opening of a temp door to adjust the ratio of the air passing through the heater core and the evaporator, supplying the air of the state desired by the passenger to the vehicle interior.

The HVAC controller 20 receives various information to control the HVAC system 10.

The HVAC controller 20 receives a measured value measured from various sensors mounted in the vehicle, for example, the internal temperature sensor 31 configured to measure the temperature inside the vehicle interior, the external temperature sensor 32 configured to measure the temperature outside the vehicle, the solar sensor 33 configured to measure the state of the sunshine of sun, the humidity sensor 34 configured to measure the humidity inside the vehicle interior, the evaporator temperature sensor 35 configured to measure the temperature of the air having passed the evaporator, and the like.

Furthermore, since the load is also required to operate the HVAC system 10, the vehicle receives information on the operating state of the engine 61. Since CAN communication for an in-vehicle control is applied to the vehicle, the information on the operating state of the vehicle may be delivered from the EMS 65 to the HVAC controller 20 through the CAN communication. The EMS 65 controls the engine 61 according to the driver's intention input from the accelerator pedal 62. As the driver operates the accelerator pedal 62, the vehicle may perform the driving of constant speed, overtaking, acceleration, starting, uphill, or the like, and decelerate or brake according to whether a braking pedal is operated. When the driver does not operate the accelerator pedal 62, or operates the accelerator pedal 62 constantly, power required by the engine 61 is not large, such that power of the engine 61 may be used in operating the HVAC system 10, but since power required by the engine 61 is large for overtaking, acceleration, starting, and uphill, and the output of the engine 61 reduces at braking, power of the engine 61 is not used for the operation of the HVAC system 10.

Meanwhile, the HVAC controller 20 determines a control value for operating each component forming the HVAC system 10, and controls each component.

Since the control method of the HVAC system for the vehicle to be described later is stored in the HVAC controller 20 as logic, the present invention determines a vehicle target cooling load (L) according to the cooling state of the vehicle interior and the operating state of the vehicle, and controls the compressor 40 by selecting any one of the maximum load (L_max) and the minimum load (L_min) according to the determined vehicle target cooling load (L).

Furthermore, in an exemplary embodiment of the present invention, in controlling the compressor 40, the HVAC controller 20 controls the electronic control valve 50 that varies the compression capacity of the compressor 40, and the HVAC controller 20 directly controls the electronic control valve 50. Conventionally, a separate valve controller configured to control the electronic control valve is provided, but in an exemplary embodiment of the present invention, the HVAC controller 20 directly controls the electronic control valve 50. That is, the HVAC controller 20 directly applies power necessary for operating the electronic control valve 50 as necessary. For example, the electronic control valve 50 is in a closed state when no power is applied, and at the instant time, the compression capacity of the compressor 40 is controlled to be maximum, and the electronic control valve 50 is open when power is applied to control so that the compression capacity of the compressor 40 is a minimum to actively switch as necessary so that the compressor 40 is operated at the minimum load.

The HVAC controller 20 of the HVAC system 10 operates the compressor 40 at the maximum load (L_max), when any one of a first target cooling load (L1) required according to a current cooling state of the vehicle and a second target cooling load (L2) required according to the operating state of the vehicle is the maximum load.

A method in which the HVAC controller 20 obtains a vehicle target cooling load (L) by use of the first target cooling load (L1) and the second target cooling load (L2) and controls the HVAC system by use of the same is stored in the HVAC controller 20 as logic and performed. However, since the control method is described below in detail as a control method of the HVAC system for the vehicle, a detailed description of the HVAC system 10 will be omitted.

Figure 3:
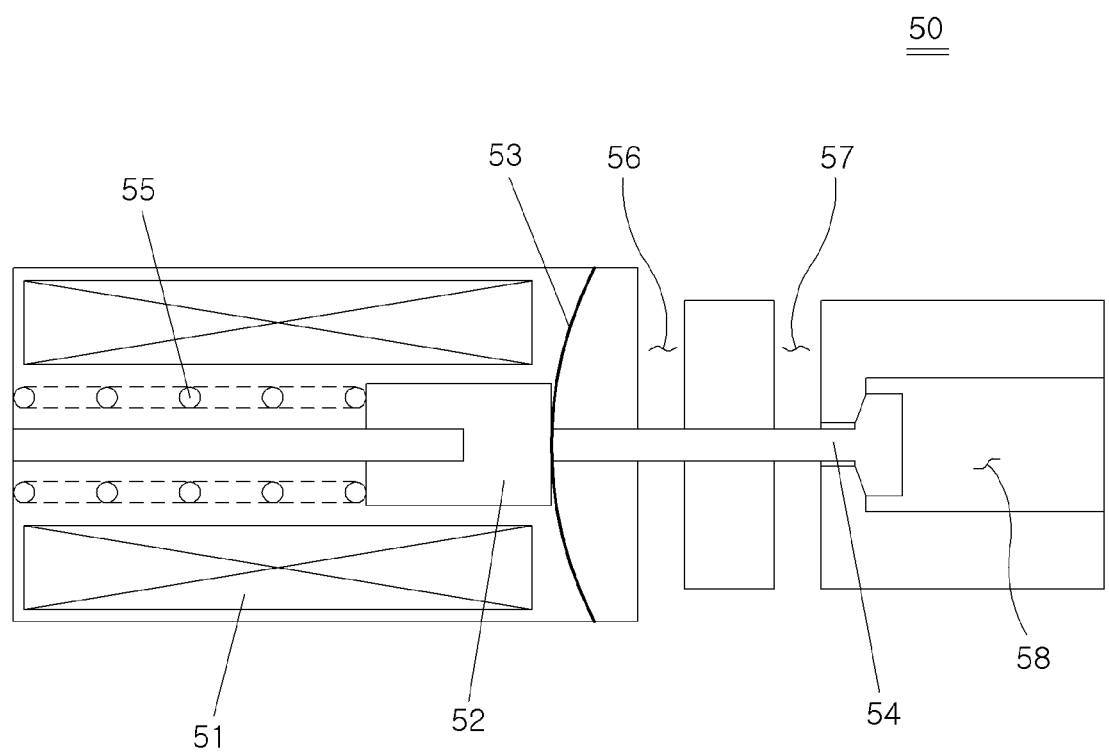
FIG. 3 is a cross-sectional diagram showing the closed state of an electronic control valve applied to an HVAC system for a vehicle according to an exemplary embodiment of the present invention.
Figure 4:
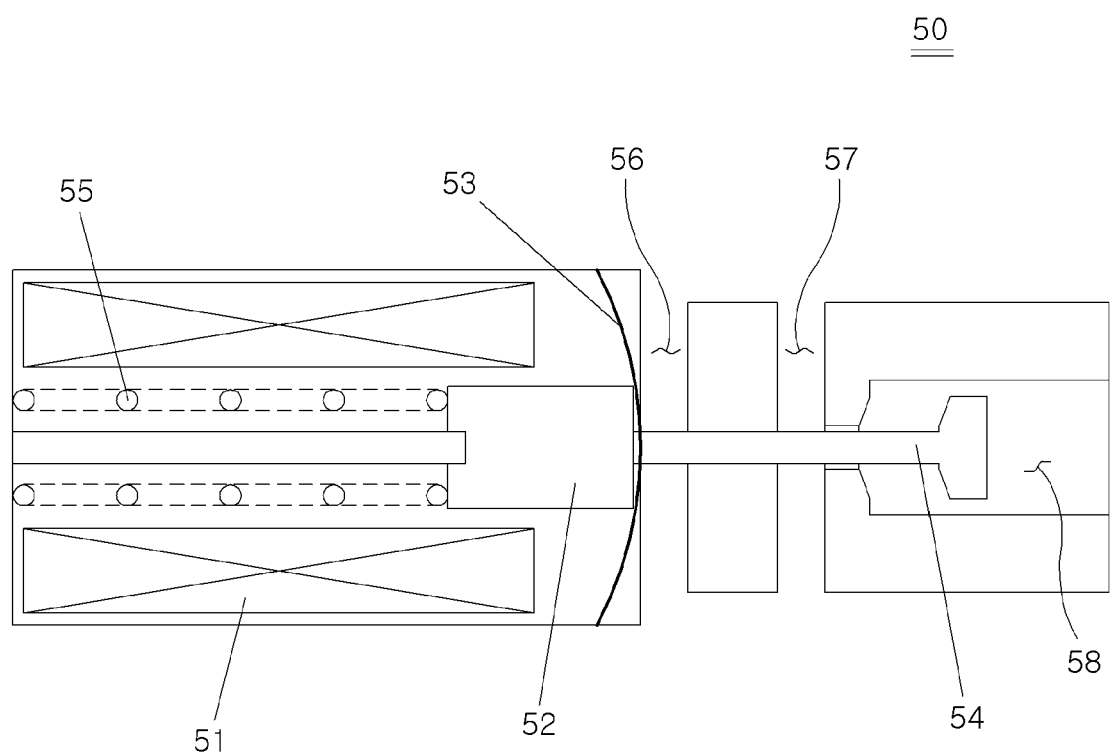
FIG. 4 is a cross-sectional diagram showing the closed state of an electronic control valve applied to an HVAC system for a vehicle according to an exemplary embodiment of the present invention.

FIG. 3 and FIG. 4 show an electronic control valve according to an exemplary embodiment of the present invention.

The electronic control valve 50 is mounted in the compressor 40 in the HVAC system 10 described above to control the angle of the swash plate 42 configured to vary the compression ratio of the compressor 40 in controlling the position of the piston 41.

In the state in which the electronic control valve 50 has been turned off, since the electronic control valve 50 is closed and there is no refrigerant operating to the swash plate 42 through the electronic control valve 50, the swash plate 42 maintains its initial state (maximum tilt angle).

Furthermore, in the state in which the electronic control valve 50 has been turned on, since the electronic control valve 50 is open and the refrigerant operating to the swash plate 42 through the electronic control valve 50, the swash plate 42 becomes the minimum tilt angle.

If the tilt angle of the swash plate 42 is the maximum, the refrigerant of the maximum capacity may be discharged from the compressor 40 to cool the interior of the vehicle at the maximum load, and if the tilt angle of the swash plate 42 is the minimum, the refrigerant of the minimum capacity is discharged from the compressor 40 to cool the vehicle interior at the minimum load.

The structure of the electronic control valve 50 will be described in detail as follows.

The electronic control valve 50 includes a solenoid 51 in a housing, a plunger 52 configured to advance when the solenoid 51 is magnetized, a supply flow path 56 formed integrally with the plunger 52 and flowing into the compressor 40, a valve body 54 configured to open or close a discharge flow path 57 discharged from the compressor 40 and a control flow path 58 configured to control the angle of the swash plate 42 mounted inside the compressor 40, a diaphragm 53 configured to operate the plunger 52 by the pressure of the refrigerant, and a return spring 55 configured to return the plunger 52.

The solenoid 51 is magnetized when power is applied from the HVAC controller 20. The HVAC controller 20 does not apply power to the solenoid 51 when the compressor 40 may be operated at the maximum load, and applies power to the solenoid 51 only when it may be operated at the minimum load.

The plunger 52 slides according to whether the solenoid 51 has been magnetized.

The valve body 54 is formed integrally with the plunger 52 to move together with the plunger 52. According to the position of the valve body 54, a flow path formed in the electronic control valve 50, for example, the supply flow path 56, the discharge flow path 57, and the control flow path 58 are open and closed.

The diaphragm 53 deforms according to the pressure of the refrigerant, and additionally moves the plunger 52. Since the circumference of the diaphragm is fixed to the housing and the plunger 52 is fixed in a state where the plunger has been penetrated to the middle, the diaphragm 53 additionally moves the plunger 52 while becoming convex or concave according to the pressure of both side surfaces of the diaphragm 53.

The return spring 55 is mounted to move the plunger 52 in a direction opposite to the magnetization of the solenoid 51. The return spring 55 elastically supports the plunger 52 to move the plunger 52 into the solenoid 51 in the solenoid 51.

Meanwhile, the plunger 52 moves according to the sum of the force acting by the solenoid 51, the diaphragm 53, and the return spring 55, respectively.

Furthermore, in an exemplary embodiment of the present invention, only the return spring 55 is applied as a spring. Conventionally, a plurality of springs have been applied to control the position of the plunger inside the electronic control valve, but in an exemplary embodiment of the present invention, only the return spring 55 may be applied as a spring, reducing the number of springs, and reducing the cost of the electronic control valve 50.

Furthermore, the electronic control valve 50 substantially controls at only any one of the maximum and the minimum, and actively controls to operate at the minimum as necessary, also simplifying the control through the HVAC controller 20.

The plurality of flow paths through which the refrigerant flows are formed in the electronic control valve 50.

The supply flow path 56 is a flow path through which the refrigerant compressed by the compressor 40 is drawn in, the discharge flow path 57 is a flow path through which the refrigerant compressed by the compressor 40 is discharged, and the control flow path 58 is a flow path through which the refrigerant used to control the angle of the swash plate 42 in the compressor 40 is discharged.

Unlike the conventional electronic control valve controlled by the duty, since the electronic control valve 50 according to an exemplary embodiment of the present invention does not require a linear control and is controlled in an on/off manner, the spring applied to the supply flow path and the control flow path side in the electronic control valve 50 of the related art may be deleted, and the current value of power applied to the solenoid 51 is not one of the values within a predetermined range, but a current value necessary for magnetizing the solenoid 51 is sufficient. Furthermore, although the elastic force of the spring has been conventionally used in the control through the supply flow path 56, the present invention utilizes the expansion force of the diaphragm 53.

The electronic control valve 50 is basically open or closed according to whether power is applied to the solenoid 51. For example, the electronic control valve 50 is in a closed state when no power is applied, and at the instant time, the swash plate 42 is maintained at the maximum angle.

The HVAC controller 20 determines the vehicle target cooling load (L) based on the first target cooling load (L1) and the second target cooling load (L2) to apply power to the solenoid 51 to operate the compressor 40 at the minimum load when it is not necessary to operate the compressor 40 at the maximum load.

Meanwhile, even when the HVAC controller 20 controls the electronic control valve 50 according to whether power is applied to the solenoid 51, the valve body 54 automatically closes the control flow path 58 to operate the compressor 40 at the maximum load when it becomes the situation where the operation of the compressor 40 is further required, as in the case where the system load rises (the case where the pressure in the supply flow path increases to the setting value or more).

Figure 6:
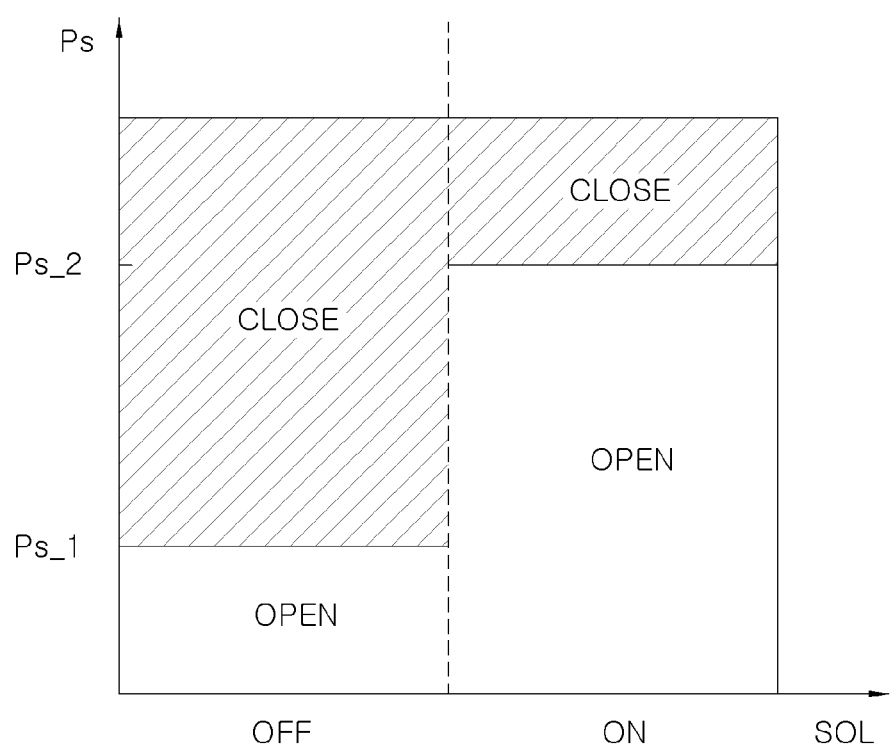
FIG. 6 is a control graph of an electronic control value of an HVAC system for a vehicle according to an exemplary embodiment of the present invention.

FIG. 6 is a diagram showing a control curve of the electronic control valve 50 for an HVAC system according to an exemplary embodiment of the present invention. Shown is whether power is applied to the solenoid 51, whether the angle of the swash plate 42 (the angle with respect to the surface perpendicular to the rotation shaft of the compressor) maintains the initial state (maximum angle) according to the pressure (Ps) of the supply flow path 56, or whether it is changed to the minimum angle.

For example, when power is not applied to the solenoid 51, and the pressure in the supply flow path 56 is a first setting pressure (Ps_1) or more set to change the opening and closing of the control flow path 58 in a state where no power has been applied, the electronic control valve 50 is maintained in a closed state, but when the pressure in the supply flow path 56 is the first setting pressure (Ps_1) or less, the electronic control valve 50 may be changed to an open state.

When power is not applied to the solenoid 51, there is no acting force (F_sol) by the solenoid 51, such that the plunger 52 may move due to the relationship between an elastic force (F_s) of the return spring 55 and a force (F_d) by the pressure acting on the diagram 53 so that the control flow path 58 may be open from the closed state. When a pressure of the refrigerant supplied to the supply flow path 56 is lowered, the elastic force (F_s) of the return spring 55 becomes greater than the force (F_d) by the pressure acting on the diaphragm 53 (F_s>F_d), such that the return spring 55 pushes the valve body 54 to the right (based on FIG. 3 and FIG. 4) and the valve body 54 opens the control flow path 58.

Meanwhile, when power is supplied to the solenoid 51, and the pressure of the supply flow path 56 is a second setting pressure (Ps_2, here, Ps_2>Ps_1) or more set to change the opening and closing of the control flow path 58 in a state where power has been applied, the electronic control valve 50 is maintained in the closed state, but when the pressure of the supply flow path 56 is the second setting pressure (Ps_2) or less, the electronic control valve 50 may be changed to an open state.

When power is applied to the solenoid 51, the plunger 52 moves by the relationship between the acting force (F_sol) of the solenoid 51, the elastic force (F_s) of the return spring 55, and the force (F_d) due to the pressure acting on the diaphragm 53 and the control flow path 58 may be open from the closed state. For example, even when power is applied to the solenoid 51, the acting force (F_s) of the solenoid 53 is smaller than the sum of the elastic force (F_s) of the return spring 55 and the force (F_d) by the pressure acting on the diagram 53 (F_sol<F_s+F_d) if the pressure of the supply flow path 56 is large and accordingly, greater than the second setting pressure (Ps_2), the valve body 54 closes the control flow path 58 and the compressor 40 maintains the maximum load (L_max). However, when the pressure in the supply flow path 56 is smaller than the second setting pressure (Ps_2), the acting force (F_s) of the solenoid 51 is greater than the sum of the elastic force (F_s) of the return spring 55 and the force (F_d) by the pressure acting on the diagram 53 (F_sol>F_s+F_d), the valve body 54 opens the control flow path 58, and the compressor 40 is changed to the minimum load (L_min).

Figure 5:
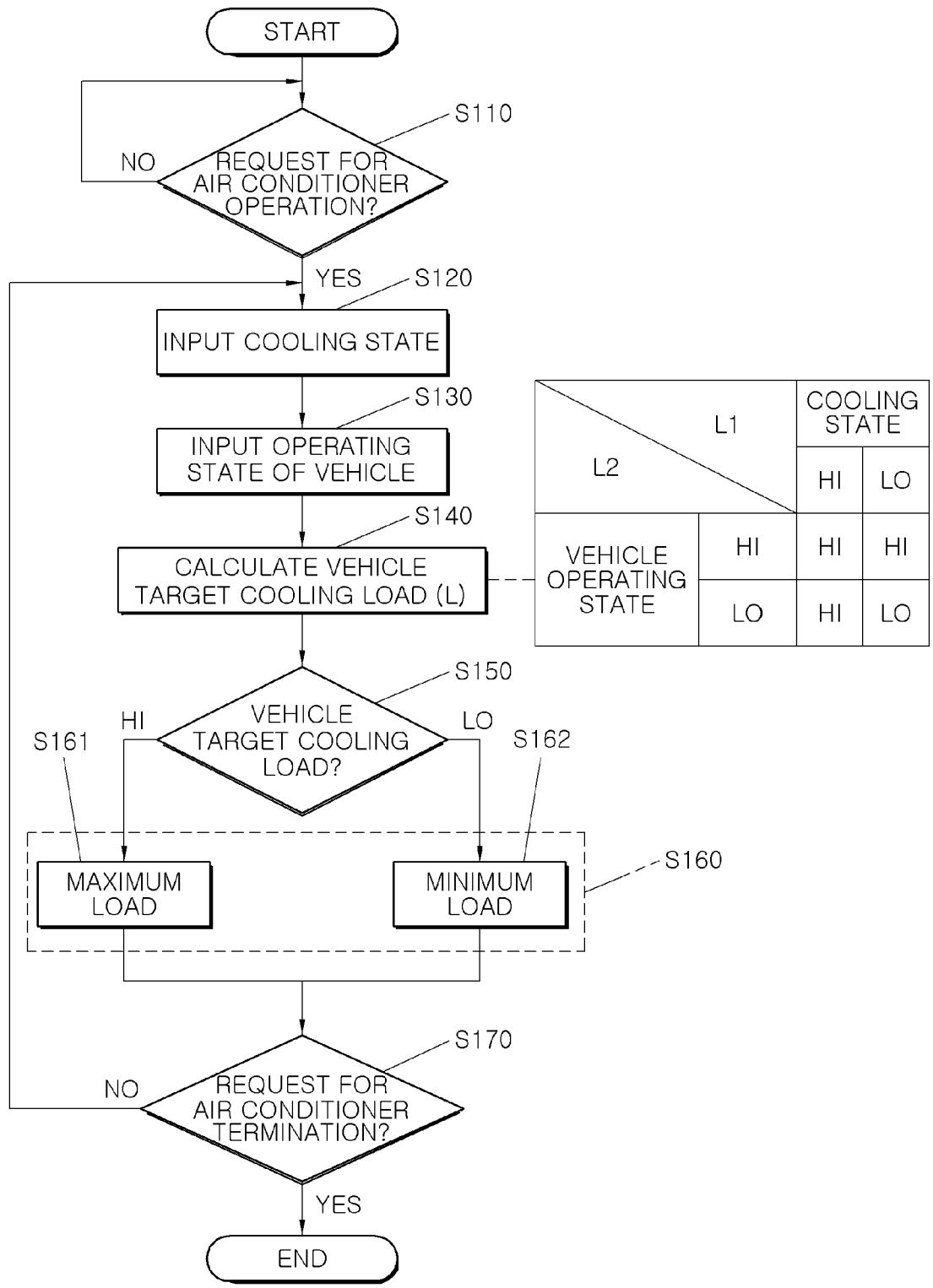
FIG. 5 is a flowchart showing a control method of an HVAC system for a vehicle according to an exemplary embodiment of the present invention.

FIG. 5 is a diagram showing a control method of an HVAC system for a vehicle according to an exemplary embodiment of the present invention.

The control method of the HVAC system for the vehicle according to an exemplary embodiment of the present invention is implemented by the HVAC system for the vehicle described above.

Determining an air conditioner operation request (operation S110) determines whether there is a request for operation of the air conditioner from the passenger. The present invention is applied to the case of cooling and dehumidifying air by use of refrigerant in the HVAC system 10, and determines whether there is a request for operation of the air conditioner from the passenger in advance. For example, it is determined whether the passenger has operated an air conditioner operation button mounted in the vehicle interior. Alternatively, in a vehicle to which Full Automatic Temperature Control (FATC) has been applied, it is also determined that there is a request for operation of the air conditioner even when the passenger sets the internal temperature to a temperature for operating the air conditioner. In the FATC, since the HVAC controller 20 operates or stops the air conditioner to maintain the temperature set by the passenger, the setting the temperature by the passenger is also included in the air conditioner operation request.

If there is the air conditioner operation request from the passenger in the determining the air conditioner operation request (operation S110), each operation to be described below is performed.

Meanwhile, if there is no air conditioner operation request from the passenger in the determining the air conditioner operation request (operation S110), the determining the air conditioner operation request (operation S110) may be repeatedly performed.

In inputting a cooling state (operation S120), the cooling state of the vehicle is input to the HVAC controller 20.

For example, the internal temperature of the vehicle may be input through the internal temperature sensor 31 of the vehicle, the temperature outside the vehicle may be input by use of the external temperature sensor 32, or the amount of sunshine to be irradiated to the vehicle may be input through the sun sensor 33. Furthermore, the humidity of the vehicle interior and the temperature of the evaporator may also be input thereto. Furthermore, the state of the compressor 40 may be input to the air conditioner controller 20.

As described above, in the inputting the cooling state (operation S120), the HVAC controller 20 receives various information on the current cooling state.

In inputting a vehicle state (operation S130), the operating state of the vehicle is input to the HVAC controller 20.

Since the operating state of the vehicle is mostly controlled through an Engine Management System (EMS) configured to control the engine 61, the HVAC controller 20 may receive the operating state of the vehicle by communicating with the EMS 65. Since the CAN communication for in-vehicle control is applied to the vehicle, the information on the operating state of the vehicle may be delivered from the EMS 65 to the HVAC controller 20 through the CAN communication.

Meanwhile, the inputting the cooling state (operation S120) and the inputting the vehicle state (operation S130) may also be performed in a reversed order. That is, after the cooling state of the vehicle and the operating state of the vehicle are input to the HVAC controller 20, determining a cooling load (operation S140) to be described later may be performed, such that the inputting the cooling state (operation S120) and the inputting the vehicle state (operation S130) may be performed in a reversed order.

The determining the cooling load (operation S140) determines the vehicle target cooling load (L) having reflected the cooling state of the vehicle and the operating state of the vehicle. The HVAC controller 20 determines a load required for the operation of the compressor 40, that is, the vehicle target cooling load (L) by reflecting the input of the cooling state of the vehicle and the operating state of the vehicle.

The vehicle target cooling load (L) is determined as the maximum load, when any one of the first target cooling load (L1) required according to the current cooling state of the vehicle and the second target cooling load (L2) required according to the operating state of the vehicle. Furthermore, when the first target cooling load (L1) and the second target cooling load (L2) are both minimum loads, the vehicle target cooling load (L) is determined as the minimum load.

Meanwhile, the process of determining the first target cooling load (L1) by the HVAC controller 20 utilizes a difference between a current internal temperature (T_i) and a target temperature (T_t).

That is, when a difference between the internal temperature (T_i) and the target temperature (T_t) is greater than a maximum load determination temperature difference (T_h) set to operate the compressor 40 at the maximum load (|(T_i−T_t)|>T_h), the first target cooling load (L1) is set to the maximum load. Furthermore, when the difference between the internal temperature (T_i) and the target temperature (T_t) is not greater than the maximum load determination temperature difference (T_h) (|(T_i−T_t)|<T_h), the first target cooling load (L1) is set to the minimum load. The case where the first target cooling load (L1) is set to the minimum load may be a case where seasonally, spring/autumn, the operating time of the air conditioner is long, a case where the internal temperature is low, a case where the target temperature is high, or a case where the refrigerant pressure is low.

When determining the second target cooling load (L2), the HVAC controller 20 determines the maximum load and the minimum load according to whether the power of the engine is further required to drive the vehicle.

During normal driving of the vehicle (for example, during constant speed driving), and additionally, when the power of the engine is further required for driving the vehicle, the HVAC controller 20 determines the second target cooling load (L2) as the minimum load, and otherwise, determines as the maximum load. If it is the situation such as the constant speed driving, starting, uphill, acceleration of the vehicle, or the like, a lot of power may be supplied for driving the vehicle, and since the power output from the engine 61 is reduced at braking, power to be supplied to the compressor 40 is insufficient, such that it determines as the minimum load. Furthermore, in the situation where the power of the engine 61 is not additionally required for driving the vehicle, the power of the engine 61 may be supplied to the compressor 40 so that the refrigerant may be compressed to the maximum, such that the HVAC controller 20 determines the second target cooling load (L2) as the maximum load.

As described above, when the first target cooling load (L1) and the second target cooling load (L2) are determined, respectively, the vehicle target cooling load (L) necessary for the HVAC system 10 is finally determined by use of these.

The vehicle target cooling load (L) is determined as the maximum load, when even any one of the first target cooling load (L1) and the second target cooling load (L2) is the maximum load. Furthermore, the vehicle target cooling load (L) is determined as the minimum load only when both of the first target cooling load (L1) and the second target cooling load (L2) are the minimum loads.

Selecting the cooling load (operation S150) determines whether the compressor 40 may be operated with any one selected from the maximum load (L_max) and the minimum load (L_min) so that the HVAC controller 20 is cooled to the determined vehicle target cooling load (L). When the vehicle target cooling load (L) has been determined as the maximum load in the determining the cooling load (operation S140), driving the maximum load (operation S161) to be described later is performed, and when the vehicle target cooling load (L) has been determined as the minimum load, driving the minimum load (operation S162) to be described later is performed.

Driving the compressor (operation S160) drives the compressor 40 according to the vehicle target cooling load (L) selected in the selecting the cooling load (operation S150).

In the driving the compressor S160, any one of the driving the maximum load (operation S161) and the driving the minimum load (operation S162) is selectively performed according to the vehicle target cooling load (L) selected in the selecting the cooling load (operation S150).

The driving the maximum load (operation S161) blocks power supply to the electronic control valve 50 in a state that has been set so that the compressor 40 compresses refrigerant to the maximum, such that the tilt angle of the swash plate 42 of the compressor 40 becomes the maximum, compressing the refrigerant to the maximum.

The driving the minimum load (operation S162) is a state where the compressor 40 drives at the minimum load (L_min) set to compress the refrigerant to the minimum. In the driving the minimum load (operation S162), the HVAC controller 20 applies power to the electronic control valve 50 so that the valve body 54 opens the control flow path 58 to minimize the tilt angle of the swash plate 42, compressing the refrigerant to the minimum.

The driving the maximum load (operation S161) is a state where power in the electronic control valve 50 has been turned off, and the capacity of compressing the refrigerant by the compressor 40 becomes maximum. The driving the minimum load (operation S162) is a state where power in the electronic control valve 50 has been turned on, and a state where the compressor 40 compresses the refrigerant to a minimum. The driving the minimum load (operation S162) may be about 5%, for example, 4% to 6% compared to the driving the maximum load (operation S161) in the capacity of the refrigerant compressed and discharged from the compressor 40.

Determining an air conditioner termination request (operation S170) is performed after the driving the compressor (operation S160) has been performed. The determining the air conditioner termination request (operation S170) determines whether there is a request for an operation termination of the compressor 40 from the HVAC controller 20 to terminate if there is a request for the operation termination. If there is no request for the operation termination, it returns to the inputting the cooling state (operation S120), and the above-described operations are repeatedly performed.

Figure 7:
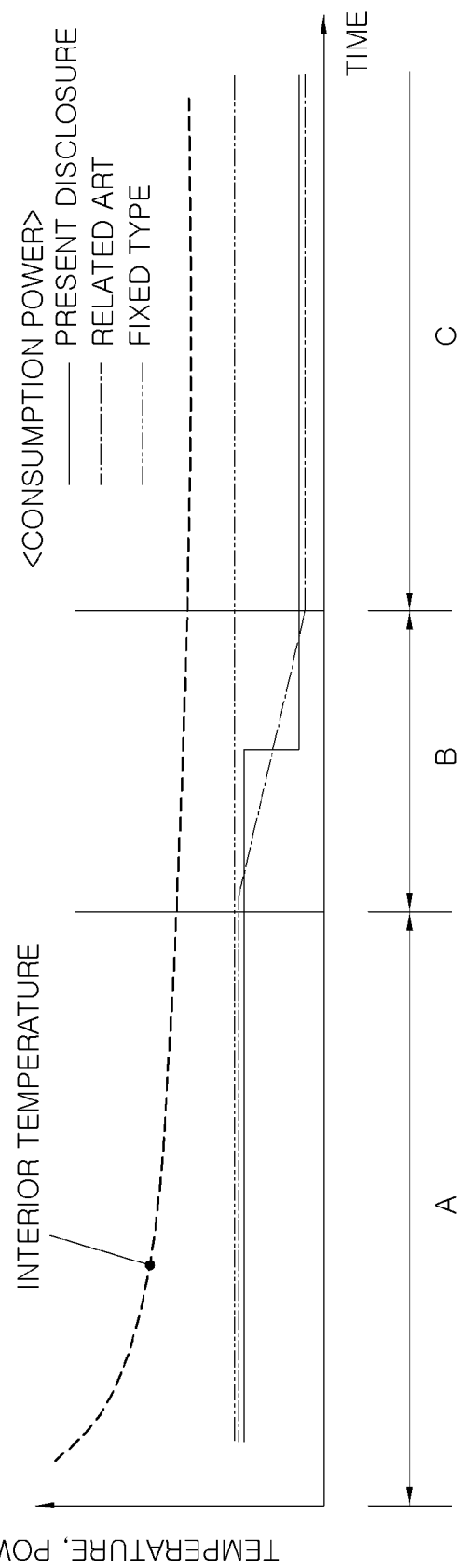
FIG. 7 is a graph showing a comparison between temperature and consumption power, when a compressor is operated at a maximum load by a control method of an HVAC system for a vehicle according to an exemplary embodiment of the present invention, and those of the related art and a fixed type.
Figure 8:
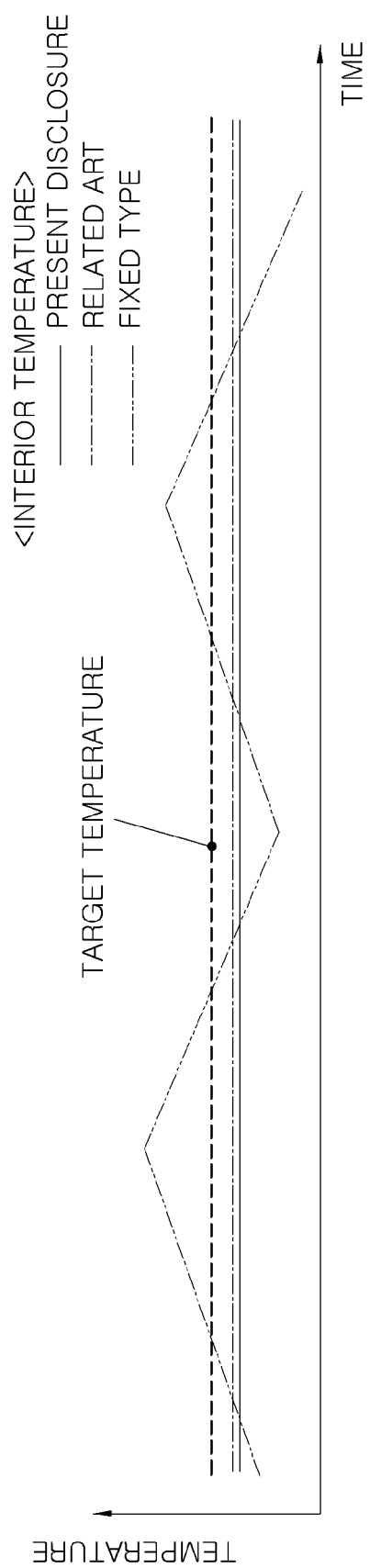
FIG. 8 is a graph showing a comparison between a change in temperature, when a compressor is operated at a minimum load by a control method of an HVAC system for a vehicle according to an exemplary embodiment of the present invention, and those of the related art and a fixed type.

In FIGS. 7 and 8, the effects on the present invention are shown by comparing the related art or a fixed type control, respectively.

FIG. 7 shows temperature and required power at operation of the maximum load. Since the compressor 40 is operating at the maximum load (L_max), the internal temperature (T_i) is gradually lowered as the time has elapsed (section A, section B), and then maintains a predetermined temperature (section C). In the section A, since the internal temperature (T_i) is high, it is operated by maximizing the required power of the compressor 40. This is common in all of the present invention, the related art, and the fixed type.

Furthermore, as in the section C, when the internal temperature (T_i) is maintained constantly in a lowered state, it is not necessary to cool the interior any more, minimizing the required power. However, since the load of the compressor may not be changed in the fixed type, it operates at the maximum load regardless of the section.

Meanwhile, as in the section B, the section that transits from the maximum load to the minimum load is transited to the minimum load while the load is gradually lowered from the maximum load, but the present invention is directly transited from the maximum load to the minimum load, such that although it may rapidly reach the minimum load, it may be seen that the consumption power of the present invention and the consumption power of the related art are equivalent in the section B.

Accordingly, at the maximum load, it is possible to first reach the minimum load while maintaining the power consumption equivalent to that of the control method generally, that is, the duty control.

FIG. 8 shows an example of comparing the present invention with the related art and the fixed type control with respect to a change in temperature at the minimum cooling.

First, since the fixed type control may not variably control the compressor, the process of exceeding or falling below the target temperature is repeated to follow the target temperature.

However, the present invention and the conventional duty control are maintained in a state close to the target temperature.

As described above, as shown in FIGS. 7 and 8, it is possible to simplify the structure and the control method of the electronic control valve 50, maintaining the advantage (reduction in consumption power) of the conventional duty control even if the production cost is lowered.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A control valve apparatus of a heating, ventilation, and air conditioning (HVAC) system and of controlling an angle of a swash plate with respect to a rotation shaft of a compressor in the HVAC system, the control valve apparatus comprising:

a solenoid member;

a plunger coupled to the solenoid member and configured to selectively slid according to whether the solenoid member is magnetized;

a valve body formed integrally with the plunger, and configured to open or close a supply flow path through which a fluid flows into the compressor, a discharge flow path through which a fluid is discharged from the compressor, and a control flow path through a fluid flows to control the angle of the swash plate mounted inside the compressor;

a diaphragm operating the plunger by a pressure of fluid; and a return spring engaged to the plunger and configured to return the plunger, wherein the solenoid member is applied with power according to a vehicle target cooling load, wherein the control valve apparatus is controlled to be opened or closed according to whether the power is applied to the solenoid member and according to a pressure of the fluid supplied to the supply flow path, wherein the control valve apparatus is configured to maintain a closed state thereof or is open according to application of the power to the solenoid member and the pressure of the fluid supplied to the supply flow path, and wherein when the pressure of the fluid supplied to the supply flow path is less than a setting pressure set to change opening and closing the control flow path, the control valve apparatus is changed to an open state.

2. The control valve apparatus of the HVAC system of claim 1, wherein the angle of the swash plate is controlled by a controller so that the angle of the swash plate is one of a maximum angle and a minimum angle.

3. The control valve apparatus of the HVAC system of claim 2, wherein in a response that the vehicle target cooling load is equal to a maximum load, the power supplied to the solenoid member is blocked and a tilt angle of the swash plate maintains a maximum state thereof so that the swash plate compresses the fluid to a maximum.

4. The control valve apparatus of the HVAC system of claim 2,
wherein in a response that the vehicle target cooling load is equal to a minimum load, the power is supplied to the solenoid member and a tilt angle of the swash plate is changed to a minimum state so that the swash plate compresses the fluid to a minimum.

5. The control valve apparatus of the HVAC system of claim 1,
wherein the setting pressure is a first setting pressure, and
wherein in a response that the power is not applied to the solenoid member, and the pressure of the fluid supplied to the supply flow path is equal to or more than the first setting pressure set to change opening and closing the control flow path in a state where the power has been not applied, the control valve apparatus is configured to be maintained in a closed state.

6. The control valve apparatus of the HVAC system of claim 1,
wherein the setting pressure is a first setting pressure, and
wherein in a response that the power is not applied to the solenoid member, and the pressure of the fluid supplied to the supply flow path is less than the first setting pressure set to change opening and closing the control flow path in a state where the power has been not applied, the control valve apparatus is changed to an open state.

7. The control valve apparatus of the HVAC system of claim 1,
wherein the setting pressure is a second setting pressure,
wherein in a response that the power is applied to the solenoid member, and the pressure of the fluid supplied to the supply flow path is equal to or more than the second setting pressure set to change opening and closing the control flow path in a state where the power has been applied, the control valve apparatus is configured to be maintained in a closed state, and
wherein the second setting pressure is higher than a first setting pressure set to change opening and closing the control flow path in a state where the power has been not applied to the solenoid.

8. The control valve apparatus of the HVAC system of claim 1,
wherein the setting pressure is a second setting pressure,
wherein in a response that the power is applied to the solenoid member, and the pressure of the fluid supplied to the supply flow path is less than the second setting pressure set to change opening and closing the control flow path in a state where the power has been applied, the control valve apparatus is changed to an open state, and
wherein the second setting pressure is higher than a first setting pressure set to change opening and closing the control flow path in a state where the power has been not applied to the solenoid.

\* \* \* \* \*